United States Patent
Fu

(10) Patent No.: US 8,636,098 B2
(45) Date of Patent: Jan. 28, 2014

(54) HYDRAULIC STEERING CONTROL VALVE AND REVERSE SELF-LOCKING STEERING SYSTEM

(76) Inventor: Liming Fu, Guilin (CN)

( * ) Notice: Subject to any disclaimer, the term of this patent is extended or adjusted under 35 U.S.C. 154(b) by 0 days.

(21) Appl. No.: 13/465,048

(22) Filed: May 7, 2012

(65) Prior Publication Data

US 2012/0217084 A1    Aug. 30, 2012

Related U.S. Application Data

(63) Continuation-in-part of application No. PCT/CN2010/001767, filed on Nov. 3, 2010.

(30) Foreign Application Priority Data

Nov. 5, 2009    (CN) .......................... 2009 1 0174484

(51) Int. Cl.
*B62D 5/06* (2006.01)

(52) U.S. Cl.
USPC ............. 180/441; 180/426; 180/417

(58) Field of Classification Search
USPC ......................... 180/441, 426, 417
See application file for complete search history.

(56) References Cited

U.S. PATENT DOCUMENTS

| | | | | |
|---|---|---|---|---|
| 2,906,361 A | * | 9/1959 | Ziskal | 180/438 |
| 5,151,860 A | * | 9/1992 | Taniguchi et al. | 701/41 |
| 6,070,691 A | * | 6/2000 | Evans | 180/433 |
| 6,941,836 B2 | * | 9/2005 | Umemura et al. | 74/552 |
| 7,185,576 B2 | * | 3/2007 | Heitzer | 91/375 A |

FOREIGN PATENT DOCUMENTS

JP    60-143182 A    7/1985

OTHER PUBLICATIONS

First Office Action in CN Patent Application No. 201080004046.0; mailed Dec. 5, 2012.

* cited by examiner

*Primary Examiner* — Tashiana Adams
*Assistant Examiner* — Marlon Arce
(74) *Attorney, Agent, or Firm* — Syncoda LLC; Feng Ma

(57) ABSTRACT

A hydraulic steering control valve, including a valve core. When an automobile runs in a straight line or the steering angle is maintained, the valve core of the hydraulic steering control valve is positioned in a middle position to cut off hydraulic pipelines of oil cylinders on two sides of a steering power cylinder or a hydraulic shock-absorbing part, and a piston of the steering power cylinder or the hydraulic shock-absorbing part is unable to move. A self-aligning mechanism is arranged at an input shaft end of the hydraulic steering control valve, and after a driver eliminates the steering torque and loosens the control to a steering wheel, the self-aligning mechanism drives the input shaft or the steering wheel to turn to the middle position, so as to fulfill the self-aligning function.

17 Claims, 5 Drawing Sheets

US 8,636,098 B2

HYDRAULIC STEERING CONTROL VALVE AND REVERSE SELF-LOCKING STEERING SYSTEM

CROSS-REFERENCE TO RELATED APPLICATIONS

This application is a continuation-in-part of International Patent Application No. PCT/CN2010/001767 with an international filing date of Nov. 3, 2010, designating the United States, now pending, and further claims priority benefits to Chinese Patent Application No. 200910174484.0 filed Nov. 5, 2009. The contents of all of the aforementioned applications, including any intervening amendments thereto, are incorporated herein by reference.

CORRESPONDENCE ADDRESS

Inquiries from the public to applicants or assignees concerning this document should be directed to: MATTHIAS SCHOLL P.C., ATTN.: DR. MATTHIAS SCHOLL ESQ., 14781 MEMORIAL DRIVE, SUITE 1319, HOUSTON, TX 77079.

BACKGROUND OF THE INVENTION

1. Field of the Invention

The invention relates to the technical field of automobile steering mechanisms, and more particularly to a hydraulic steering control valve and a reverse self-locking steering system.

2. Description of the Related Art

An automobile steering system is a special mechanism used for changing or keeping the automobile driving direction, related to the control stability and security of automobiles, and can be divided into two categories: a mechanical steering system and a power steering system. In the mechanical steering system, a manual steering gear is used as a core component, and a steering wheel, a steering shaft, a universal joint, and a link mechanism (a steering tie rod, a steering drag link, etc.) are used as accessories. The power steering system includes a hydraulic power steering system and an electric power steering system. The hydraulic power steering system mainly includes a manual steering gear, a steering oil pump, a steering control valve, and a steering power cylinder; the electric power steering system mainly includes a manual steering gear, a direct-current motor, and a servo mechanism.

To reduce the accidental impact of the road surface to wheels during the automobile driving process as well as the phenomena of kickback of the steering wheel due to the accidental stress to the wheels, the addition of a hydraulic shock-absorbing part (buffer oil cylinder) in the steering mechanism is a commonly used technical means for various steering systems, so that the kickback to the steering wheel under the accidental acting force to the wheels is reduced, and the driving safety performance is enhanced.

The buffer action of the buffer oil cylinder is limited. When a great accidental resistance is applied to the direction guide wheels, the automobile steering mechanism will generate a serious kickback of the steering wheel, and even a driver loses control to the steering wheel. A driver has 0.5 seconds of lag response before being able to control the direction. Thus, the driver fails to restrict the yaw direction due to the accidental resistance to the direction guide wheels, and the driving safety will be seriously affected.

The self-aligning technology is a basic function and technical requirement of a steering system. The self-aligning means that the steering system automatically returns to the straight driving state after the driver eliminates the steering torque and loosens the control to the steering wheel after the steering completion. The steering mechanism automatically turns round (the driver is not required to apply any turning force) under the acting force of the road surface to the direction guide wheels, so that each steering system in the prior art does not have the reverse self-locking function. In the hydraulic power steering system, a valve core of a steering control valve is positioned in the middle (spool in the free state) position when the automobile runs in a straight line or the driver stops steering operation. Oil cylinders on two sides of the steering power cylinder are communicated with a low-pressure oil circuit (oil storage pot) through an oil passage on the valve core, and a piston of the steering power cylinder can freely move, so as to provide a hydraulic passage required for the self-aligning of the steering wheel. In the electric power steering system, a power-driven motor only runs when the steering operation is executed by the driver, and the motor or power-assisted mechanism does not have the self-locking function when the steering operation is terminated, so as to keep the self-aligning function of the steering system.

The conventional steering system has defects due to the lack of a reverse self-locking function. For example, when the direction guide wheels suffer from a sudden accidental resistance, a yaw in direction will be inevitable due to the driver's 0.5 seconds of lag response time to the steering wheel kickback, and the driving safety will be seriously compromised. The realization of a reverse self-locking function of the steering system, prevent and eliminate the kickback to the steering wheel due to the accidental resistance to the direction guide wheels and avoid the yaw in direction due to the external force to the direction guide wheels under the premise of maintaining the self-aligning function of the steering system is a research subject for the technical improvement and upgrading of the steering system.

SUMMARY OF THE INVENTION

In view of the above-described problems, it is one objective of the invention to provide a hydraulic steering control valve and a reverse self-locking steering system. A steering system with reverse self-locking function is formed by adopting a special design scheme of the hydraulic steering control valve and a steering power cylinder or a buffer oil cylinder.

To achieve the above objective, in accordance with one embodiment of the invention, there is provided a hydraulic steering control valve, comprising a valve core; wherein when an automobile runs in a straight line or a steering angle is maintained, the valve core of the hydraulic steering control valve is positioned in the middle (spool in the free state) position to cut off hydraulic pipelines of oil cylinders on two sides of a steering power cylinder or a hydraulic shock-absorbing part, and a piston of the steering power cylinder or the hydraulic shock-absorbing part is unable to move; a self-aligning mechanism is arranged at a steering shaft end of the hydraulic steering control valve, and after a driver eliminates the steering torque and loosens the control to a steering wheel, the self-aligning mechanism drives the steering shaft or the steering wheel to turn to the straight driving state, so as to fulfill the self-aligning function.

In a class of this embodiment, the self-aligning acting force is provided for the self-aligning mechanism under the action of spring force and/or hydraulic pressure and/electric force, and the self-aligning acting force (torque) is equal to or greater than the sum of a force (torque) to open the valve core of the hydraulic steering control valve and a force (torque) to overcome rotation friction of the steering wheel.

In a class of this embodiment, the self-aligning mechanism can be arranged at a section and position between a rotating shaft of the automobile steering wheel and a transmission chain at the steering shaft end of the hydraulic steering control valve.

In a class of this embodiment, the self-aligning mechanism can be designed, manufactured, or installed with a valve body of the hydraulic steering control valve in a separate manner.

In a class of this embodiment, the hydraulic shock-absorbing part of the hydraulic steering control valve is a buffer oil cylinder.

In accordance with another embodiment of the invention, there is provided a reverse self-locking steering system, comprising the hydraulic steering control valve and the steering power cylinder or the hydraulic shock-absorbing part; wherein when an original automobile steering system is a mechanical steering system or an electric power steering system, the hydraulic steering control valve and/or the hydraulic shock-absorbing part are/is additionally arranged in the original automobile steering system to form the reverse self-locking steering system; when the original automobile steering system is a hydraulic power steering system, the hydraulic steering control valve (comprising a self-aligning mechanism) replaces the original hydraulic steering control valve, so as to form the reverse self-locking steering system.

Advantages of the invention are summarized below:

First, when the automobile runs in a straight line or the steering action is stopped (steering to any position), the oil cylinders on two sides of the steering power cylinder (or buffer oil cylinder) as well as an external hydraulic passage are cut off by the valve core of the hydraulic steering control valve, and the piston of the steering power cylinder or the buffer oil cylinder will be in the stabilized condition; when the counteracting force of the direction guide wheels to the steering mechanism is transferred to the piston of the steering power cylinder or the buffer oil cylinder, the piston will not be able to move and force transmission will be inhibited, which will prevent the phenomena of the steering wheel kickback and the resulting yaw in direction, and thus the control stability and driving safety performance of vehicles are enhanced;

Second, the self-aligning function of the steering system is fulfilled through the specially designed spring force (hydraulic pressure or electric force) self-aligning mechanism, the self-aligning is consistent with the steering gyroaction effect executed by the driver, the self-aligning is gentle and fast, and the influence from the stress situations of the direction guide wheels and the real-time state of a suspension mechanism is smaller, thus a convenience is provided for the design of automobile control stability; and Third, the structure and the manufacturing process of the hydraulic steering control valve are similar to those of the steering control valve in the prior art, the technology and process are mature and reliable, both the steering power cylinder and the buffer oil cylinder are used as universal parts in the technical field of automobiles, and particularly, in the automobile hydraulic power steering system in the prior art, the setting functions of the invention can be realized simply by replacing the original steering control valve with the hydraulic steering control valve. In the mechanical steering system and the electric power steering system in the prior art, the two components of the hydraulic steering control valve and the buffer oil cylinder are also only required to be additionally arranged, thus the mechanical steering system and the electric power steering system in the prior art have the outstanding characteristics of succinct process and low cost, have the excellent characteristic compatible with all automobile steering systems in the prior art, and are favorable for large-scale popularization and application. Therefore, the control stability and driving safety performance will be greatly enhanced due to this unique reverse self-locking function.

DETAILED DESCRIPTION OF THE EMBODIMENTS

Figure 1:
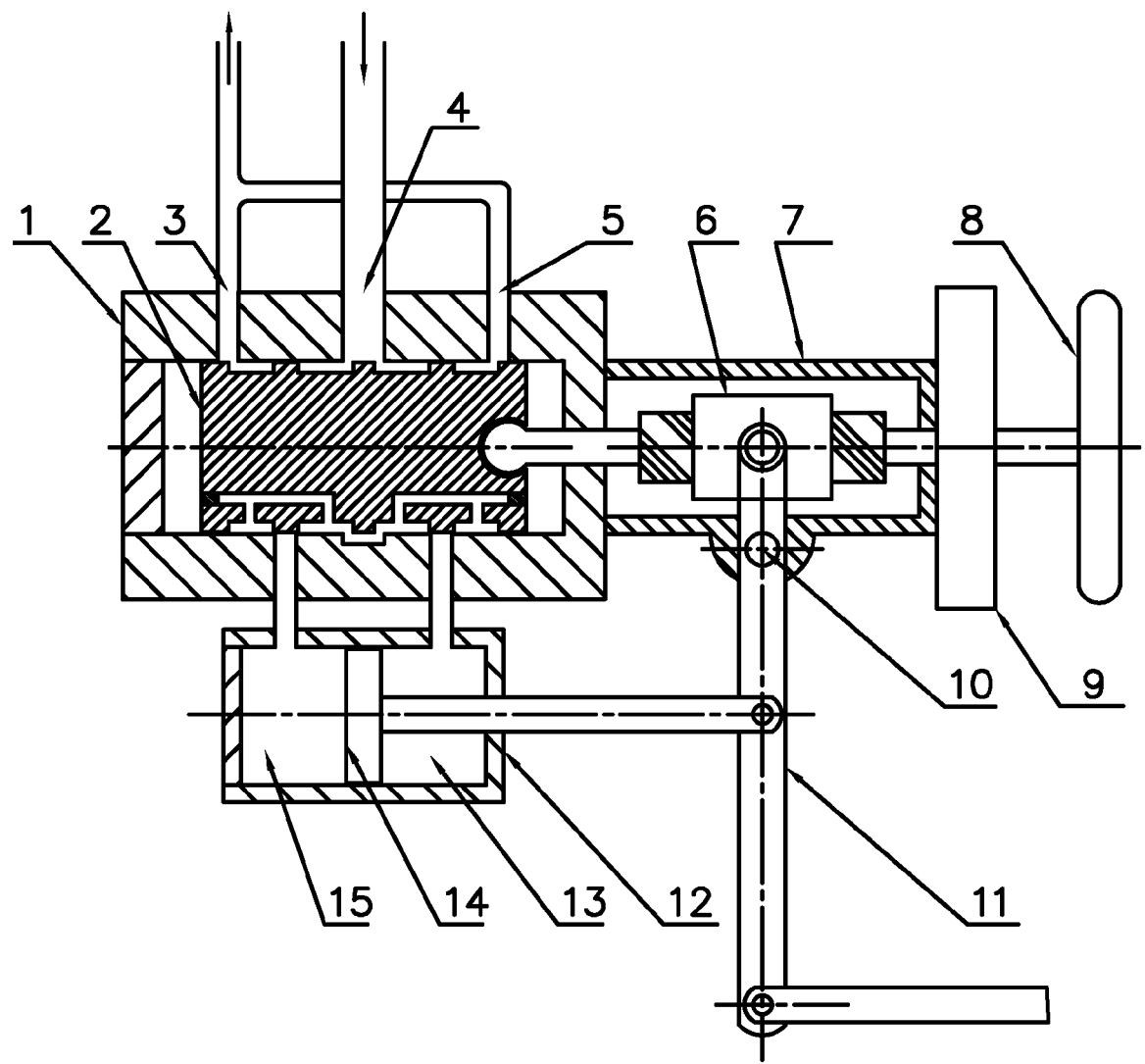
FIG. 1 is a structural diagram of a hydraulic steering control valve when the automobile runs in a straight line or any steering angle is maintained.
Figure 2:
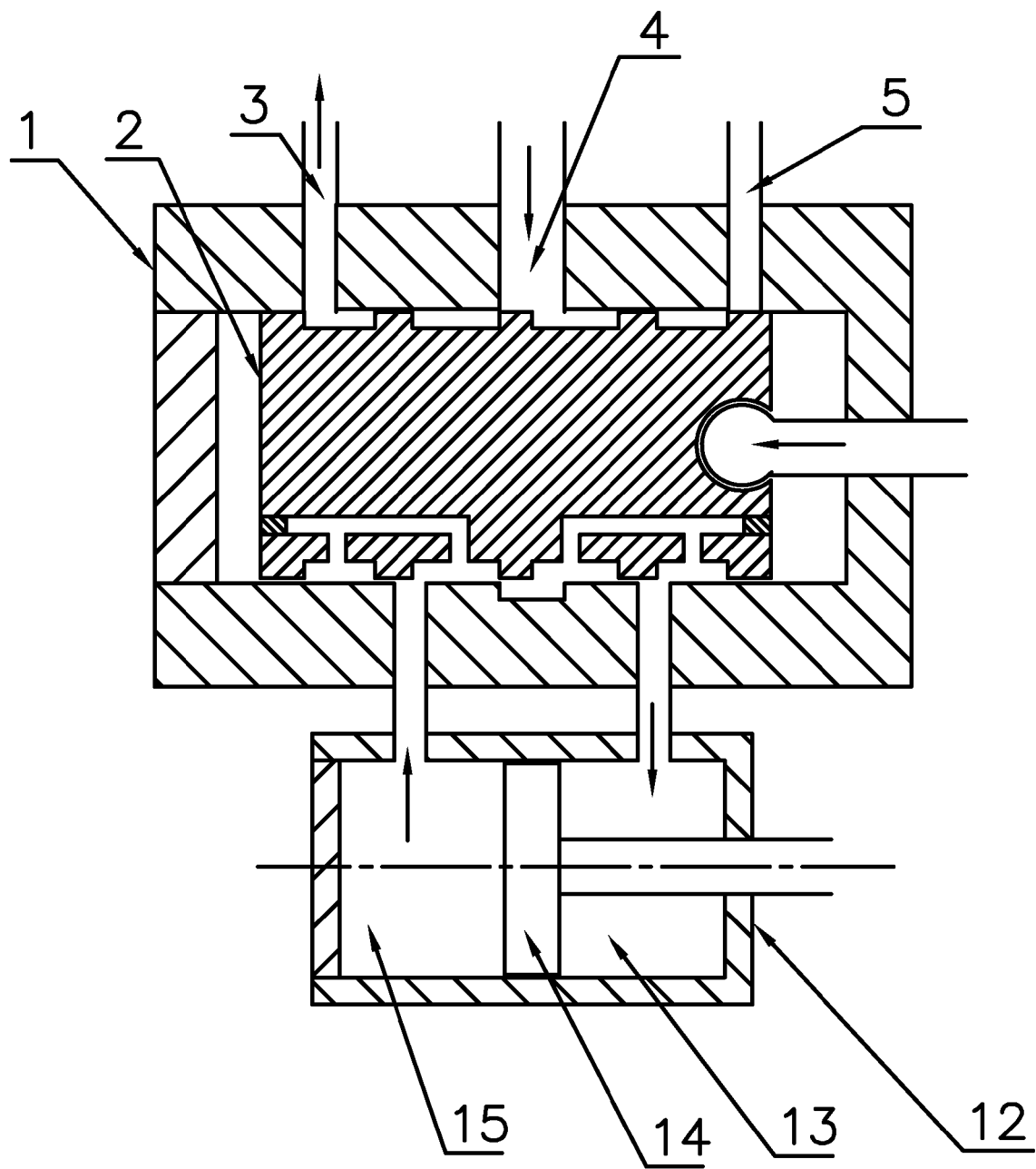
FIG. 2 is a structural diagram of a hydraulic steering control valve when the driver executes left-turn operation.

The following drawings and embodiments aim to serve as the further description for the hydraulic steering control valve. FIG. 1 and FIG. 2 are structural diagrams of a hydraulic steering control valve (slide valve). A housing 1 of the hydraulic steering control valve, a valve core 2 of the hydraulic steering control valve, a left oil outlet 3, an oil inlet 4, a right oil outlet 5, a manual steering gear 6, a manual steering gear housing 7, a steering wheel 8, a self-aligning mechanism 9, a pitman arm rotating shaft fulcrum 10, a rock arm 11 of the manual steering gear, a steering power cylinder housing 12, an oil cylinder 13 on the right side of the steering power cylinder, a piston 14 (adopting an integral structure with a connecting rod) of the steering power cylinder, and an oil cylinder 15 on the left side of the steering power cylinder are shown in FIG. 1.

As shown in FIG. 1, when the automobile runs in a straight line or any steering angle is maintained, the valve core 2 of the hydraulic steering control valve is positioned in the middle (spool in the free state) position. Passages of the oil cylinders on the left side and the right side of the steering power cylinder are cut off by the valve core 2, and the piston 14 of the steering power cylinder fails to move. The pressure oil output by the steering pump enters the hydraulic steering control valve through the oil inlet 4, and then flows back to the oil storage pot through left and right oil passages on the valve core 2, the left oil outlet 3 and the right oil outlet 5. When the direction guide wheels surfer from an accidental resistance, the piston 14 of the steering power cylinder fails to move, the rock arm 11 of the manual steering gear is fixed through the piston 14 of the steering power cylinder and the pitman arm rotating shaft fulcrum 10, and the accidental resistance to the direction guide wheels is blocked to prevent the steering mechanism from moving, thus the technical objective of reverse self-locking in the technical scheme is achieved.

As shown in FIG. 2, when the driver executes left-turn operation, the valve core 2 of the hydraulic steering control valve moves left, the oil inlet 4 and the left oil passage on the valve core 2 are cut off, the oil cylinder 13 on the right side of the steering power cylinder is infused with oil by the steering pump through the oil inlet 4 and the right oil passage on the valve core 2. The oil cylinder 15 on the left side of the steering power cylinder is communicated with the oil storage pot via the left oil passage on the valve core 2, and the pressure oil from the steering pump pushes the piston 14 of the steering power cylinder to move left, so as to achieve the hydraulic power steering function. When the driver maintains a steering angle, the valve core 2 returns to the middle position under the action of a valve core resetting mechanism (by spring or elastic torsion bar, not shown in FIG. 2) inside the hydraulic steering control valve, and the passages of the oil cylinders on the left side and the right side of the steering power cylinder are cut off, so as to realize the reverse self-locking function during the process of maintaining any steering angle. After the driver stops steering and loosens the control to the steering wheel (the valve core and steering wheel are spool in the free state), the steering shaft of the hydraulic steering control valve turns round to a straight driving state under the acting force (torque) of the self-aligning mechanism, which is similar to when the driver executes a right-turn operation. The self-aligning, which occurs quickly, has a simultaneous power steering effect.

The action effect and the functional principle during the right-turn operation executed by the driver are same as those during the left-turn operation.

The technical scheme is stated by taking a slide valve type steering control valve as a representative example. Likewise, the technical scheme is suitable for a rotary valve type steering control valve.

The steering power action of the hydraulic steering control valve is entirely consistent with the control principle and function effect of the steering control valve in the prior art.

Figure 3:
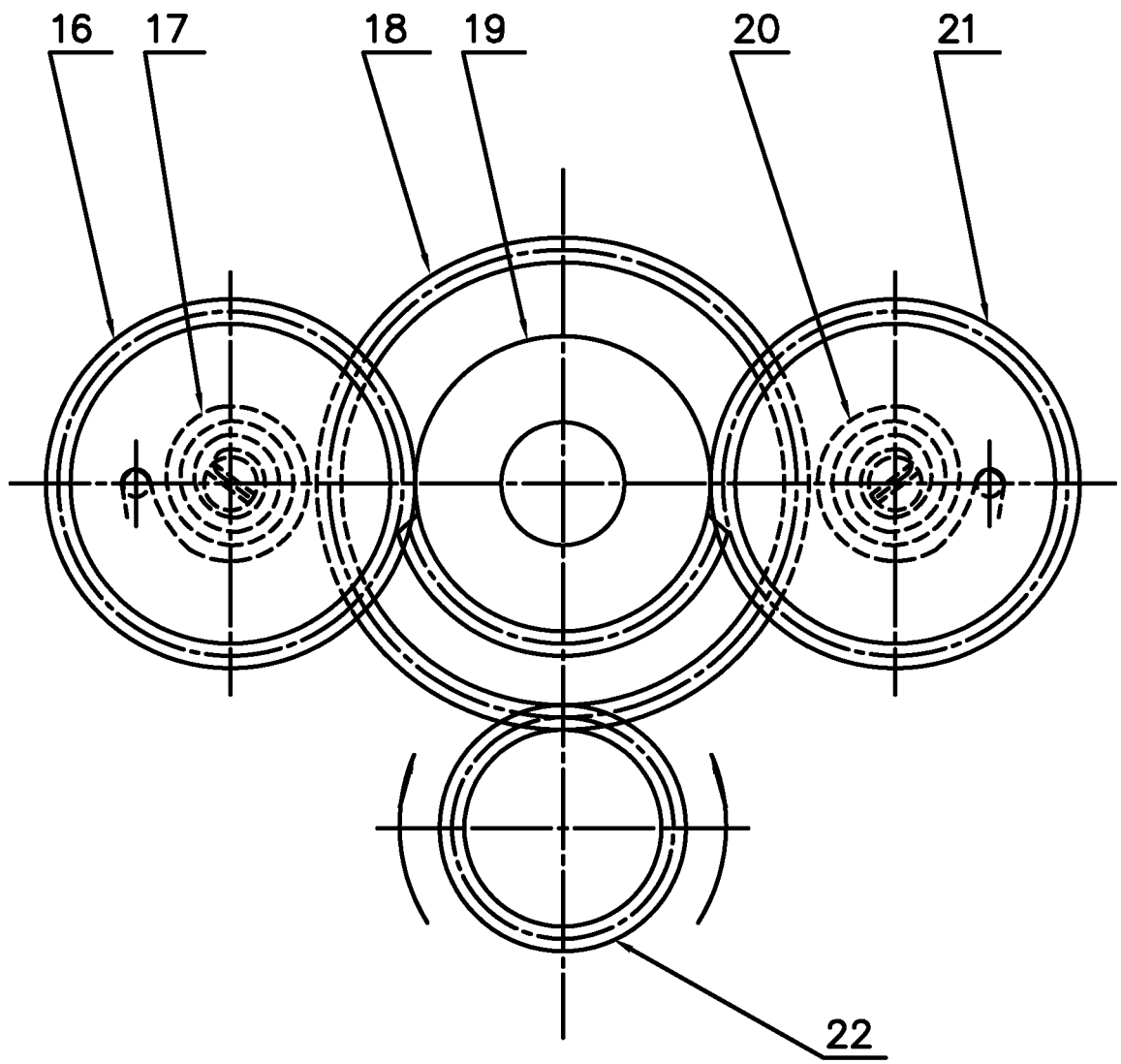
FIG. 3 is a diagram for the principle of a spring force self-aligning mechanism of a hydraulic steering control valve.

FIG. 3 is a diagram for the structural principle of the spring force self-aligning mechanism of the hydraulic steering control valve. A gear 22 of the steering shaft of the hydraulic steering control valve, a right coil spring gear 21, a right coil spring 20, a semi-circular gear 19 and a reduction gear 18 are shown in FIG. 3, so that the left steering angle (single side) or right steering angle of the steering shaft of the hydraulic steering control valve is reduced to equal to and less than 180 degrees from 540-720 degrees, A left coil spring 17 and a left coil spring gear 16 are also shown in FIG. 3. When the driver executes left-turn operation, the gear 22 of the steering shaft of the hydraulic steering control valve anticlockwise rotates, the reduction gear 18 clockwise rotates, the semi-circular gear 19 and the reduction gear 18 coaxially rotate, the right coil spring gear 21 is demeshed with the semi-circular gear 19, the left coil spring gear 16 is driven by the semi-circular gear 19 to rotate, and the left coil spring 17 is screwed up. After the driver eliminates the left-steering torque and loosens the control to the steering wheel, the left coil spring 17 rebounds to drive the left coil spring gear 16 to clockwise rotate, and the gear 22 of the steering shaft of the hydraulic steering control valve is driven to clockwise rotate by the semi-circular gear 19 and the reduction gear 18. When the semi-circular gear 19 rotates to be simultaneously meshed with the left coil spring gear 16 and the right coil spring gear 21, the steering shaft (and steering wheel) of the hydraulic steering control valve returns to the straight driving state (middle) position, so as to realize the self-aligning function of the steering system.

The self-aligning mechanism of the hydraulic steering control valve can be arranged at any section and any position between the rotating shaft of the automobile steering wheel and the transmission chain at the input shaft end of the hydraulic steering control valve, and can be designed or manufactured with the valve body of the hydraulic steering control valve in a split manner, so as to benefit the structural design and installation of the self-aligning mechanism.

Figure 4:
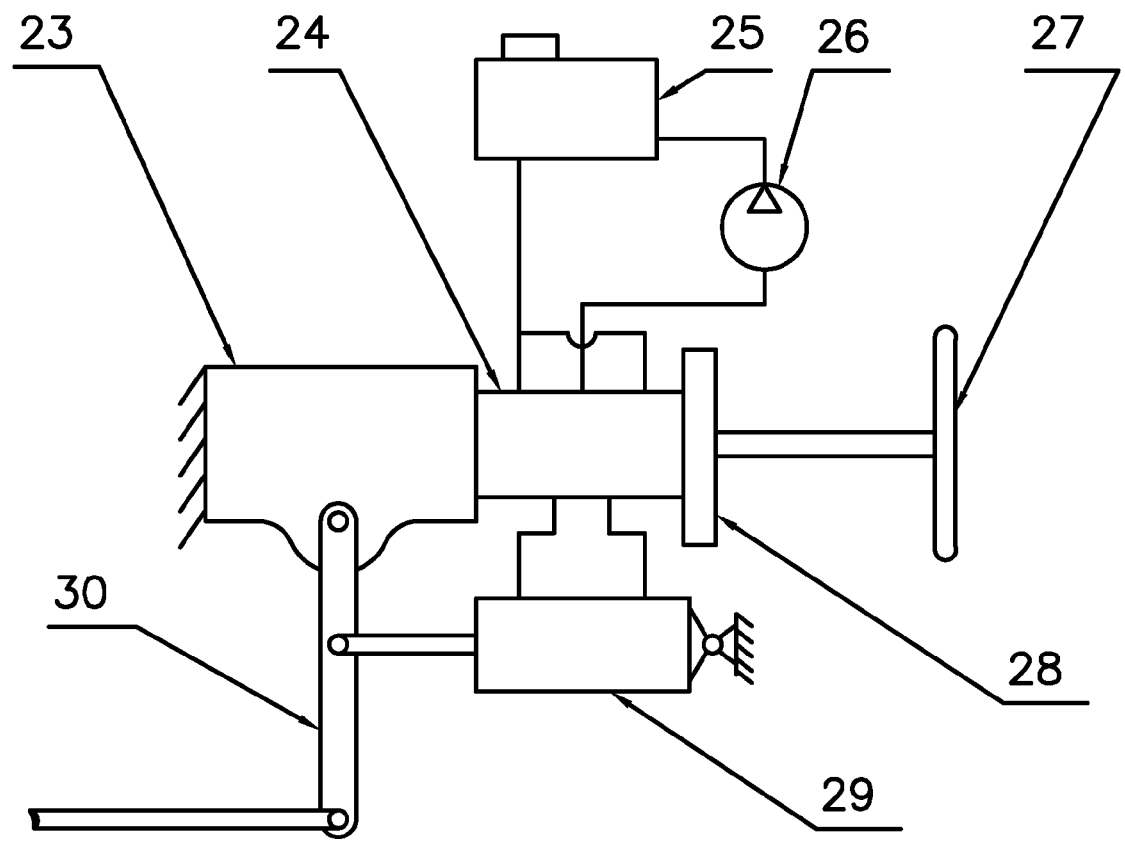
FIG. 4 is a diagram for the principle of a reverse self-locking steering system formed based on a hydraulic power steering system.

FIG. 4 is an example of the reverse self-locking steering system based on an automobile hydraulic power steering system. A manual steering gear 23, a hydraulic steering control valve (reverse self-locking) 24, an oil storage pot 25, a steering pump 26, a steering wheel 27, a steering self-aligning mechanism 28, a steering power cylinder 29, and a pitman arm 30 are shown in FIG. 4.

Compared with the hydraulic power steering system in the prior art, the distinguishing characteristic of the embodiment only lies in that the hydraulic steering control valve (reverse self-locking) provided with the spring force self-aligning mechanism is used for replacing the original steering control valve. The hydraulic steering control valve has the reverse self-locking function, and its spring force self-aligning mechanism has the steering self-aligning function, so that the steering system with steering power effect entirely consistent with that in the prior art as well as with reverse self-locking function is formed, and has good compatibility and adaptability with the hydraulic power steering system in the prior art.

Figure 5:
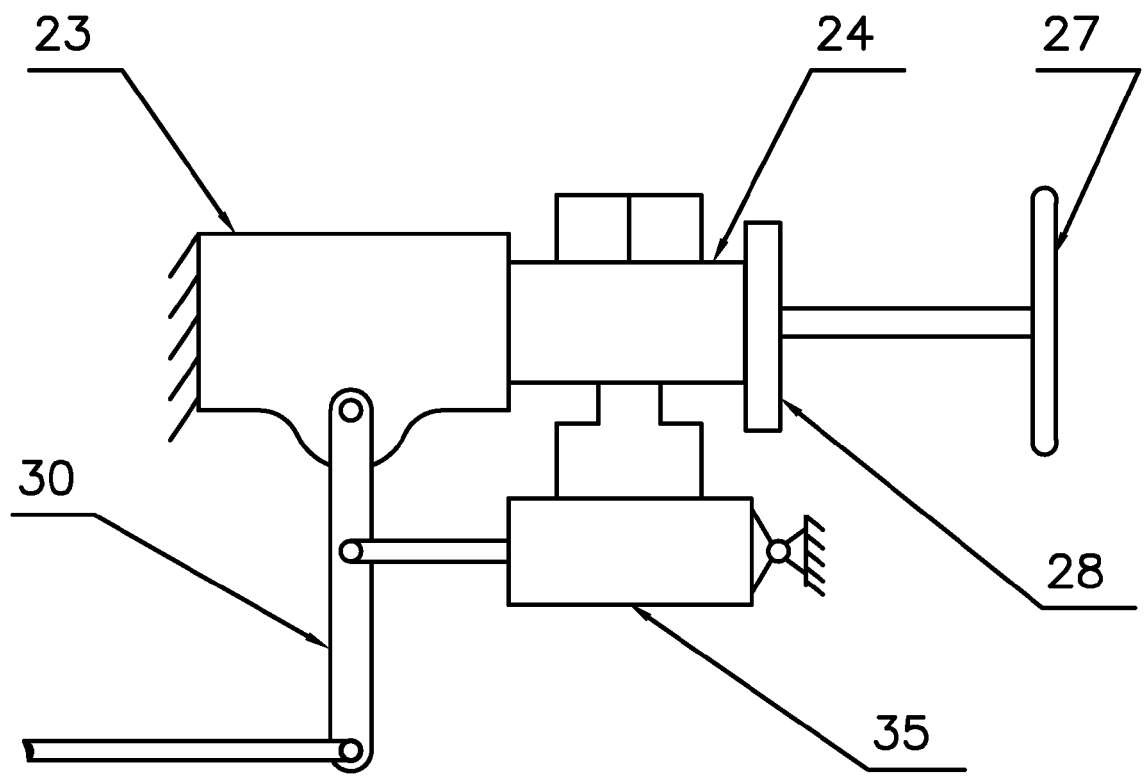
FIG. 5 is a diagram for the principle of a reverse self-locking steering system formed based on a mechanical or electric power steering system.

FIG. 5 is an example of the reverse self-locking steering system formed based on an automobile electric power steering system or a mechanical power steering system. A manual steering gear 23, a hydraulic steering control valve 24, a steering wheel 27, a steering self-aligning mechanism 28, a buffer oil cylinder 35, and a pitman arm 30 are shown in FIG. 5.

The hydraulic steering control valve 24 and its steering self-aligning mechanism 28 and buffer oil cylinder 35 are additionally arranged in the mechanical or electric power steering system disclosed in the prior art, and the oil inlet and the oil outlet of the hydraulic steering control valve are communicated with each other, so as to form the reverse self-locking steering system. When the valve core of the hydraulic steering control valve is positioned in the middle (spool in the free state) position, the hydraulic passages of the oil cylinders on two sides of the buffer oil cylinder 35 are cut off at the same time, and the piston of the buffer oil cylinder fails to move to block the accidental acting force to the direction guide wheels, so as to realize the reverse self-locking function. When the driver executes steering operation, the oil cylinders on two sides of the buffer oil cylinder are mutually communicated via the oil inlet and the oil outlet, the piston of the buffer oil cylinder freely moves along with the rotation (swing) of the pitman arm 30, and there is no interference and impediment to the steering operation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A steering control device configured to control steering of automobile wheels through a steering wheel, the steering control device comprising:
    a valve core configured to:
        in response to an accidental external force acting on the automobile wheels, block a resulting force over the steering wheel; and allow the steering wheel to resume steering operation without interference or impediment if the steering wheel receives steering operation executed by a driver; and a self-aligning mechanism configured to drive the steering wheel to turn to a straight line position if the steering wheel does not receive steering operation executed by the driver;

wherein the valve core is configured to cut off one or more hydraulic pipelines of one or more oil cylinders disposed on two sides of a steering power cylinder or a hydraulic shock-absorbing part such that a piston of the steering power cylinder or the hydraulic shock-absorbing part is unable to move; and wherein a self-aligning torque of the self-aligning mechanism is equal to or greater than a sum of a torque to open the valve core and a torque to overcome a rotation friction of the steering wheel.

2. The steering control device of claim 1,
wherein the self-aligning torque is provided for the self-aligning mechanism through at least one of a spring force, a hydraulic pressure, or an electric force.

3. The steering control device of claim 1,
wherein after the self-aligning torque is removed, the self-aligning mechanism is configured to drive the steering wheel to turn to a straight line position; and
wherein the self-aligning mechanism is arranged at a position between a rotating shaft of the steering wheel and a transmission chain at a steering shaft end of the steering control device.

4. The steering control device of claim 1,
wherein the self-aligning mechanism is designed, manufactured, or installed with a valve body of the steering control device in a separate manner.

5. The steering control device of claim 1,
wherein the hydraulic shock-absorbing part of the steering control device is a buffer oil cylinder.

6. The device of claim 1, wherein the valve core is configured to cut off the one or more hydraulic pipelines when at a middle position.

7. A steering system, comprising:
a steering control device configured to control steering of automobile wheels through a steering wheel, the steering control device comprising:
a valve core configured to cut off one or more hydraulic pipelines of one or more oil cylinders disposed on one or more sides of a steering power cylinder or a hydraulic shock-absorbing part such that a piston of the steering power cylinder or the hydraulic shock-absorbing part is unable to move;
a self-aligning mechanism, wherein a self-aligning torque of the self-aligning mechanism is equal to or greater than a sum of a torque to open the valve core and a torque to overcome a rotation friction of the steering wheel;
wherein the self-aligning mechanism is configured to drive the steering wheel to turn to a straight line position if the driver loosens control to the steering wheel.

8. The system of claim 7, further comprising:
a steering power cylinder and a hydraulic shock-absorbing part for a mechanical steering system or an electric power steering system.

9. The system of claim 7, wherein for a hydraulic power steering system, the hydraulic steering control device also acts as a conventional hydraulic steering control valve.

10. The system of claim 7, wherein the valve core is configured to:
in response to an accidental external force acting on the automobile wheels, substantially block a resulting force over the steering wheel; and
allow the steering wheel to resume steering operation without interference or impediment if the steering wheel receives steering operation executed by a driver.

11. The system of claim 7, wherein the self-aligning torque is provided for the self-aligning mechanism through at least one of a spring force, a hydraulic pressure, or an electric force.

12. The system of claim 7, wherein the self-aligning mechanism is arranged at a position between a rotating shaft of the steering wheel and a transmission chain at a steering shaft end of the steering control device.

13. The system of claim 7, wherein the self-aligning mechanism is designed, manufactured, or installed with a valve body of the steering control device in a separate manner.

14. The system of claim 7, wherein the hydraulic shock-absorbing part of the steering control device is a buffer oil cylinder.

15. A method of controlling steering of automobile wheels through a steering wheel, the method comprising:
in response to an accidental external force acting on the automobile wheels, substantially blocking a resulting force over the steering wheel;
resuming steering operation without interference or impediment if the steering wheel receives a steering operation executed by a driver; and
driving the steering wheel to turn to a straight line position if the steering wheel does not receive steering operation executed by a driver;
wherein said blocking comprises preventing a piston of a steering power cylinder from moving by cutting off passages of oil cylinders on left and right sides of the steering power cylinder with a valve core; and
wherein said driving the steering wheel to turn to a straight line position comprises having a self-aligning toque overcome a toque to open the valve core and a torque resulting from rotation friction of the steering wheel.

16. The method of claim 15, further comprising:
in response to the steering wheel receiving a left or right turn operation executed by a driver, opening the passages by correspondingly moving the valve core to the left or to the right, thereby realizing a hydraulic power steering function.

17. The method of claim 16, further comprising: in response to the steering wheel maintaining a steering angle, moving the valve core to a middle position to thereby achieve said cutting off and said blocking.

* * * * *